Feb. 7, 1928. Re. 16,868

R. W. ANDERSON

ADVERTISING STAND

Original Filed Aug. 22, 1924

Inventor
Russell W. Anderson
By Whittemore Hulbert
Whittemore & Belknap
Attorneys Reissued Feb. 7, 1928. Re. 16,868

UNITED STATES PATENT OFFICE.

RUSSELL W. ANDERSON, OF DETROIT, MICHIGAN.

ADVERTISING STAND.

Original No. 1,635,394, dated July 12, 1927, Serial No. 733,525, filed August 22, 1924. Application for reissue filed September 6, 1927. Serial No. 217,862.

This invention has reference to structures for display purposes of the type generally known as lawn or sidewalk stands adapted to support plates provided with advertising matter.

The object of the said invention is to provide such a stand of a very durable nature which may be cheaply constructed and which will support an advertising plate, more particularly a circular plate, or two of said plates back to back, in a manner whereby the upper edges of the said plate or plates, which are very often prone to corrosive action of the weather are protectively housed.

It is also an object of the said invention to provide a support for such plate or plates which will be both light and strong and not liable to warping, and which is particularly adapted for the reception and firm securing of such plate or plates in position thereon; and a still further object is to provide a device of this type wherein advantage is taken of the space beneath said plate or plates for additional display purposes together with a bracing of the frame to prevent distortion of the vertical legs thereof.

Further objects subsidiary to or resulting from the aforesaid objects, or from the construction or operation of the invention as it may be carried into effect, will become apparent as the said invention is hereinafter further disclosed.

In carrying the said invention into effect I may provide a novel construction and arrangement of parts more particularly described and ascertained hereinafter, by way of example having reference to the accompanying drawing, wherein—

Similar characters of reference indicate similar parts in both figures of the drawing.

Figure 1:
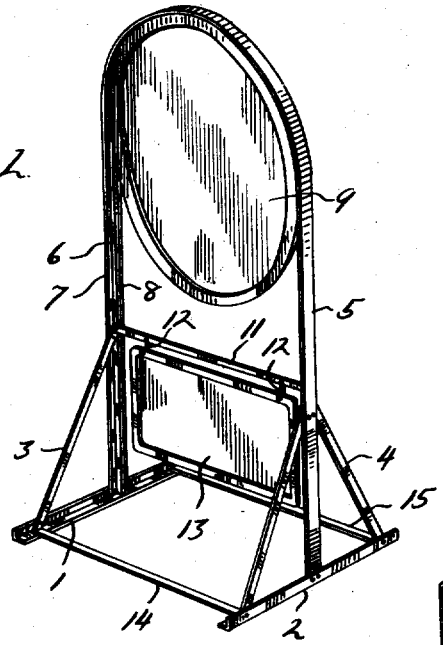
Figure 1 is a perspective view of a lawn or sidewalk stand embodying the said invention.

1 and 2 are angle irons forming the base and provided with braces 3 and 4 which assist in the supporting of a frame 5 on the said base. This frame 5 is of an inverted U-shaped configuration having a curved upper portion and downwardly extending integral legs, the extremities of which rest on the members 1 and 2 of the base.

This frame 5 is inwardly webbed, being shown as constructed of T-iron, and 6 indicates the internal web of the frame, 7 and 8 being the flanges of the said T-iron.

Secured to the curved portion of the said web 6 of the frame are circular advertising plates 9 and 10 on opposite sides thereof, the upper peripheries of which are protectively housed beneath the curved portions of the flanges 7 and 8 of the said frame so that such edges are guarded from attack by rain or corrosive agents in the atmosphere as will be readily understood.

For further bracing of the legs of the said frame a tie rod or brace 11 is shown extending between the web 6 of the said legs in preventing distortion thereof, and this brace is provided with hooks 12 upon which is suspended a further advertising plate 13 as shown.

To prevent warping of the frame 5 as a result of stresses set up in the bending thereof to shape, I provide tie members 14 and 15 extending between the angle irons 1 and 2 near their extremities.

Figure 3:
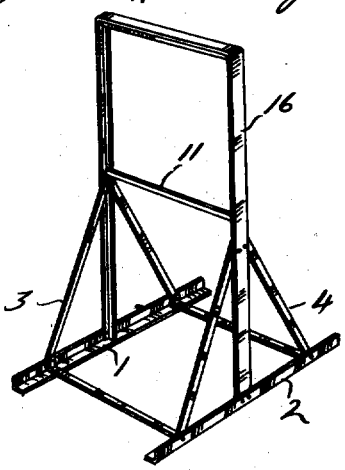
Figure 3 is a similar view to Figure 1, on a smaller scale, showing a frame adapted for rectangular plates.
Figure 2:
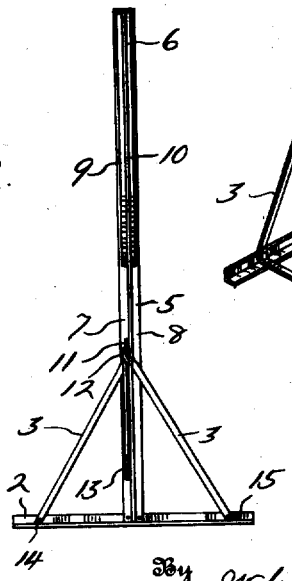
Figure 2 is a vertical transverse section of the same.

In the modified form, Figure 3, I illustrate a frame 16 of T-iron the web being notched as at 17 to permit of angular corners being formed and the protective function of the flanges being still maintained.

Such a device as that described may be manufactured cheaply and is particularly adapted to be shipped in knockdown condition, and when assembled and installed is extremely durable lending itself to the very effective display of advertising matter. The protection afforded to the circular advertising plates increases their life and prevents marring of the marginal surface of the advertising matter displayed thereon; and this invention may be developed within the scope of the following claims without departing from the essential features of the said invention, it being therefore desired that the specification and drawing be read as being merely illustrative and not in a limiting sense except as necessitated by the prior art.

What I claim is:—

1. An advertising stand comprising a rectangular frame-like base having angle iron sides with upstanding flanges, a display plate, a support therefor in the form of a one-piece inverted U-shaped frame constructed of T-iron with the web thereof extending inwardly of said frame, said plate having its upper edge conforming to the shape of the upper curved portion of the U-shaped frame and having said edge secured closely in the angle of the T-iron, said support having its ends resting on the angle irons of said base and attached to the upstanding flanges thereof intermediate the front and rear edges of said base, and braces connecting the ends of said angle irons to said support and bearing against the webs of said support at points below said plate.

2. An advertising stand comprising a base including members provided with upstanding portions, a display plate, a support therefor comprising a one-piece inverted substantially U-shaped frame provided with a portion extending inwardly thereof, said plate being secured within the base of said U-shape and attached to said inwardly extending portion, the ends of said support being secured to the upstanding portions of said base, and braces connected to the upstanding portions of said base and to said frame.

3. An advertising stand comprising a base including members provided with upstanding portions, a display plate, a support therefor comprising a one-piece inverted substantially U-shaped frame provided with a portion extending inwardly thereof, said plate being secured within the base of said U-shape and attached to said inwardly extending portion, the ends of said support being secured to the upstanding portions of said base and braces connected to the upstanding portions of said base and to said frame and bearing against the inwardly extending portion thereof.

In testimony whereof I affix my signature.

RUSSELL W. ANDERSON.